United States Patent
Rengakuji

(10) Patent No.: US 8,279,309 B2
(45) Date of Patent: *Oct. 2, 2012

(54) IMAGE CAPTURING DEVICE WITH SIGNAL SAMPLING

(75) Inventor: Hideyuki Rengakuji, Koto-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

This patent is subject to a terminal disclaimer.

(21) Appl. No.: 12/418,142

(22) Filed: Apr. 3, 2009

(65) Prior Publication Data

US 2009/0196579 A1    Aug. 6, 2009

Related U.S. Application Data

(63) Continuation of application No. 11/049,826, filed on Feb. 3, 2005, now Pat. No. 7,532,241.

(30) Foreign Application Priority Data

Feb. 6, 2004   (JP) ................................ 2004-030828
Jan. 31, 2005  (JP) ................................ 2005-023510

(51) Int. Cl.
*H04N 5/225* (2006.01)

(52) U.S. Cl. ........ 348/262; 348/205; 348/312; 348/351; 348/231.3

(58) Field of Classification Search .................. 348/262, 348/205, 351, 312, 231.3–231.6
See application file for complete search history.

(56) References Cited

U.S. PATENT DOCUMENTS

| | | | | |
|---|---|---|---|---|
| 4,542,406 A | * | 9/1985 | Shimoyama et al. | 348/472 |
| 6,452,974 B1 | * | 9/2002 | Menon et al. | 375/240.28 |
| 7,532,241 B2 | * | 5/2009 | Rengakuji | 348/262 |
| 2004/0117819 A1 | * | 6/2004 | Yu | 725/32 |

FOREIGN PATENT DOCUMENTS

JP    2000-244914 A    9/2000

\* cited by examiner

*Primary Examiner* — Usman Khan
(74) *Attorney, Agent, or Firm* — Canon U.S.A., Inc. IP Division

(57) ABSTRACT

An image capture device includes a first clock generating unit that generates a first clock for sampling a video signal using a first crystal oscillator, a second clock generating unit that generates a second clock for sampling an audio signal using a second crystal oscillator, a calculating unit that calculates a correction value for adjusting a shift between the first clock and the second clock, and an adjusting unit that adjusts a driving timing of a capturing unit according to the correction value.

46 Claims, 5 Drawing Sheets

IMAGE CAPTURING DEVICE WITH SIGNAL SAMPLING

CROSS-REFERENCE TO RELATED APPLICATIONS

This application is a continuation of U.S. patent application Ser. No. 11/049,826, filed on Feb. 3, 2005, which claims priority to Japanese Patent Application 2005-023510, filed on Jan. 31, 2005 and Japanese Patent Application, 2004-030828 filed on Feb. 6, 2004, the contents of all of which are hereby incorporated by reference.

BACKGROUND OF THE INVENTION

1. Field of the Invention

The present invention relates to an image capture device capable of capturing video with audio, such as a digital camera or a camera-equipped portable phone.

2. Description of the Related Art

Recently, digital cameras having a capability for capturing not only still images but also video with audio have been commercially available (see, for example, Japanese Patent Laid-Open No. 2001-197414).

In an image capture device, when a clock for sampling a video signal and a clock for sampling an audio signal are generated using two different crystal oscillators, a shift can occur between the two crystal oscillators, thus causing a shift between the video and the audio. If such an image capture device captures video with audio for a long time, the video and audio become increasingly shifted as the capturing time passes.

SUMMARY OF THE INVENTION

Among other advantages, the image capture device of the present invention is capable of capturing video with audio for a long time without the occurrence of a shift between the video and audio.

In an aspect of the present invention, an image capture device includes a first clock generating unit that generates a first clock for sampling a video signal using a first crystal oscillator, a second clock generating unit that generates a second clock for sampling an audio signal using a second crystal oscillator, a calculating unit that calculates a correction value for adjusting a shift between the first clock and the second clock, and an adjusting unit that adjusts a driving timing of a capturing unit according to the correction value.

In another aspect of the present invention, an image capture system includes a first clock generating means for generating a first clock for sampling a video signal using a first crystal oscillator; a second clock generating means for generating a second clock for sampling an audio signal using a second crystal oscillator; a calculating means for calculating a correction value for adjusting a shift between the first clock and the second clock; and an adjusting means for adjusting a driving timing of a capturing means based on the correction value.

Further yet, in another aspect, a shift-correction method for use during image playback is disclosed. The shift-correction method includes: generating a first clock signal that samples a video signal using a first crystal oscillator; generating a second clock signal that samples an audio signal using a second crystal oscillator; and determining a correction value that corrects a shift between the first clock and the second clock. It is noted that the shift between the first clock and the second clock is corrected so that the shift is not perceivable by a user during playback of the video and audio signals.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE EMBODIMENTS

Embodiments of the invention will be described in detail below with reference to the drawings.

Embodiments of the present invention will now be described with reference to the drawings. In the following description, a device having a function for capturing an image and recording image data of the captured image onto a storage medium, such as a digital camera or a camera-equipped portable phone, is referred to as an image capture device.

Figure 1:
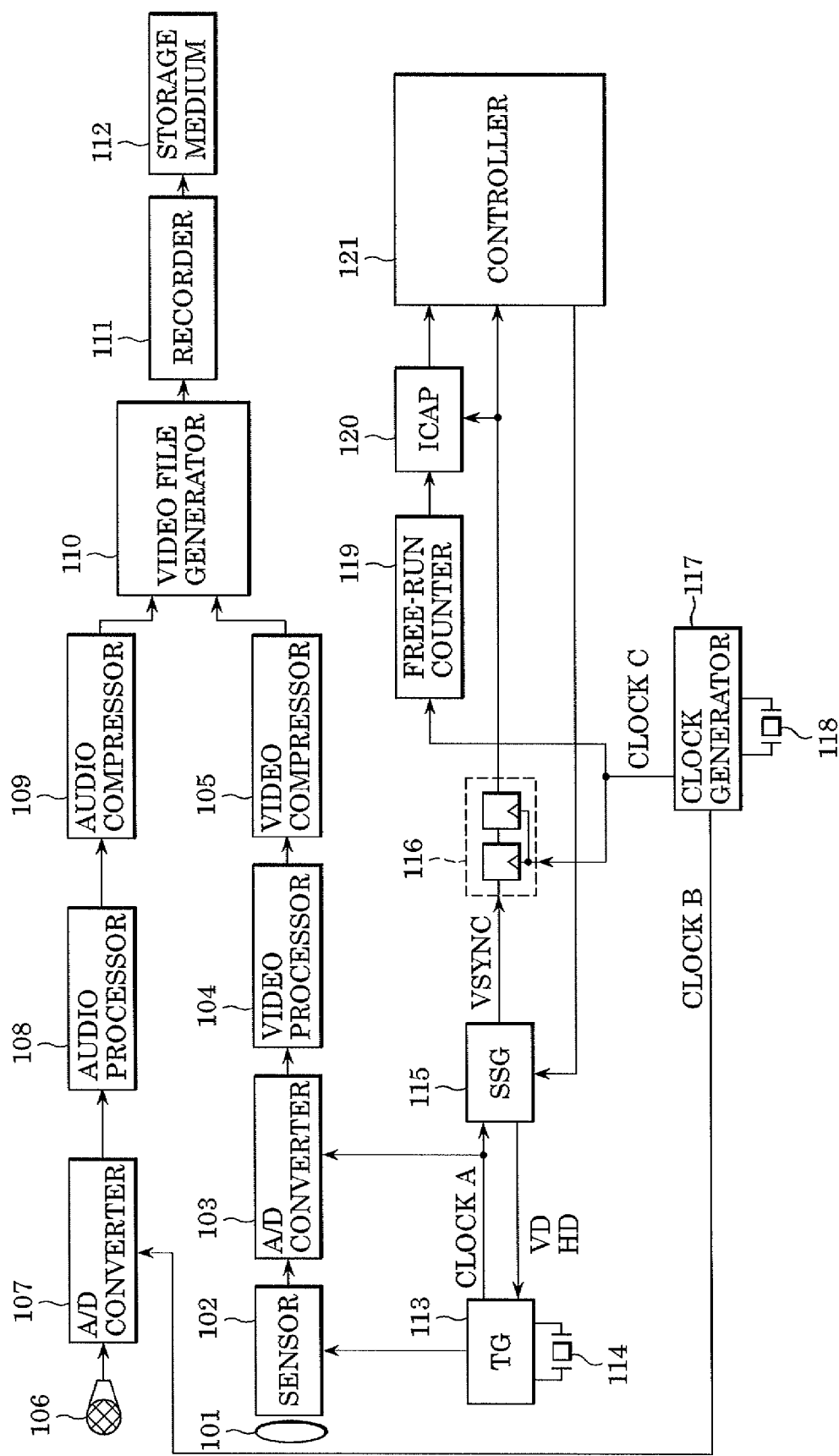
FIG. 1 is a block diagram of a portion of an image capture device according to an embodiment of the present invention.

FIG. 1 is a block diagram of a portion of an image capture device according to an embodiment of the present invention. In the present embodiment, the image capture device has a function for capturing audio and for capturing video having 30 frames per second (fps), and a function for allocating 22050 bytes of audio data to 30 frames. However, the present invention is not limited to this embodiment.

In FIG. 1, an image sensor 102, e.g., a charge-coupled device (CCD) sensor or a complementary metal-oxide semiconductor (CMOS) sensor, sequentially captures optical images input through an optical unit 101 according to a vertical synchronization (sync) signal VD and a horizontal sync signal HD, and outputs the sequentially captured optical images as a video signal. An analog-to-digital (A/D) converter 103 converts the video signal output from the image sensor 102 into a digital video signal according to a clock A supplied from a timing generator (TG) 113, and outputs the video data. A video processor 104 performs predetermined image processing on the video data. A video compressor 105 compresses the video data using a predetermined video compression technique, and outputs a video bit stream.

A microphone 106 converts input audio into an audio signal. An A/D converter 107 converts the audio signal output from the microphone 106 into a digital audio signal according to a clock B supplied from a clock generator 117, and outputs the audio data. An audio processor 108 performs predetermined audio processing on the audio data. An audio compressor 109 compresses the audio data using a predetermined audio compression technique, and outputs an audio bit stream.

A video file generator 110 generates a video file including the video bit stream output from the video processor 105 and the audio bit stream output from the audio compressor 109. A recorder 111 records the video file generated by the video file generator 110 onto a storage medium 112. The storage medium 112 may be a disk medium, a semiconductor memory, or the like.

The TG 113 generates a clock A using a first crystal oscillator 114. The clock A has a clock frequency at which a video signal is sampled, and is supplied to a sync signal generator (SSG) 115 and the A/D converter 103. The TG 113 also generates a readout pulse using a vertical sync signal VD and a horizontal sync signal HD supplied from the SSG 115, and supplies the generated readout pulse to the image sensor 102.

Figure 2:
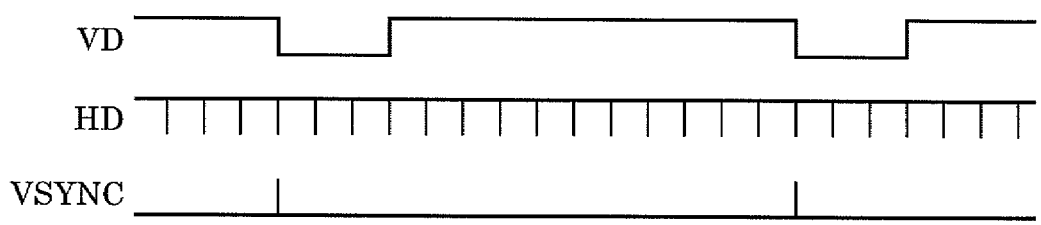
FIG. 2 is a chart showing the relationship between VD, HD, and VSYNC pulses.

The SSG 115 generates a vertical sync signal VD and a horizontal sync signal HD using the clock A supplied from the TG 113, and supplies the generated sync signals VD and HD to the TG 113. The SSG 115 further adjusts the vertical sync signal VD and the horizontal sync signal HD according to a correction value supplied from a controller 121. Thus, the driving timing of the image sensor 102 is adjusted. The SSG 115 also generates a VSYNC pulse in synchronization with the vertical sync signal VD, as shown in FIG. 2. A synchronizer 116 synchronizes the VSYNC pulse to a clock C. The synchronizer 116 includes, for example, two D flip-flops that are driven by the clock C, and the D flip-flops are connected in series. The output pulse of the synchronizer 116 is supplied to an input capturer (ICAP) 120 and the controller 121.

The clock generator 117 generates clocks B and C using a second crystal oscillator 118. The clock B has a clock frequency at which an audio signal is sampled, and is supplied to the A/D converter 107. The clock C has a higher clock frequency than the horizontal sync signal HD output from the SSG 115, and is supplied to the synchronizer 116 and a free-run counter 119.

The free-run counter 119 is a counter whose count value is updated by the clock C supplied from the clock generator 117. The free-run counter 119 has a sufficient number of bits to indicate the count value of one period of the VSYNC pulse that is counted by the clock C. For example, the free-run counter 119 has 16 or more bits when the value of one period of the VSYNC pulse that is counted by the clock C is 30000.

Figure 3:
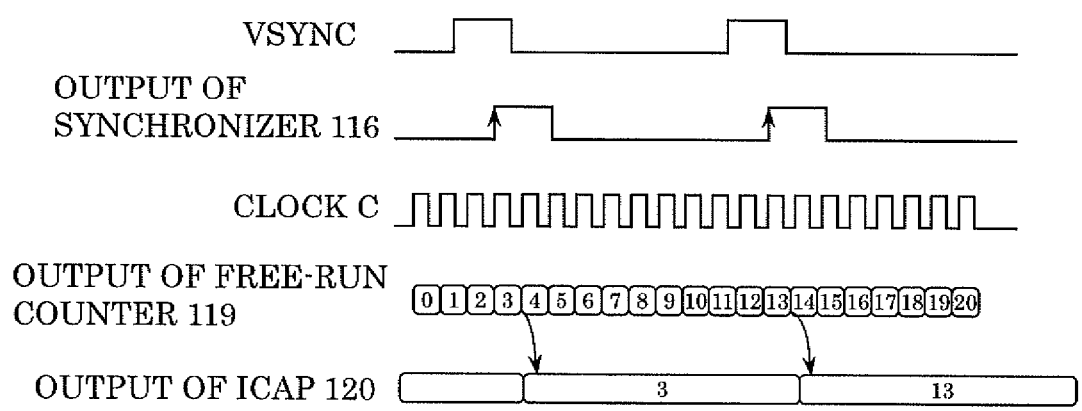
FIG. 3 is a chart showing the relationship between the VSYNC pulse and an output pulse of an image capturer (ICAP).

FIG. 3 shows the relationship between the VSYNC pulse, the output pulse of the synchronizer 116, the clock C, the output pulse of the free-run counter 119, and the output pulse of the ICAP 120. As can be seen from FIG. 3, the output pulse of the ICAP 120 is updated every VSYNC pulse. Since the VSYNC pulse is synchronized with the vertical sync signal VD, the difference between output values of the ICAP 120 corresponds to the count value of one period of the vertical sync signal VD that is counted by the clock C. In FIG. 3, the ICAP 120 latches the output value of the free-run counter 119 when the output pulse of the synchronizer 116 rises.

Figure 4:
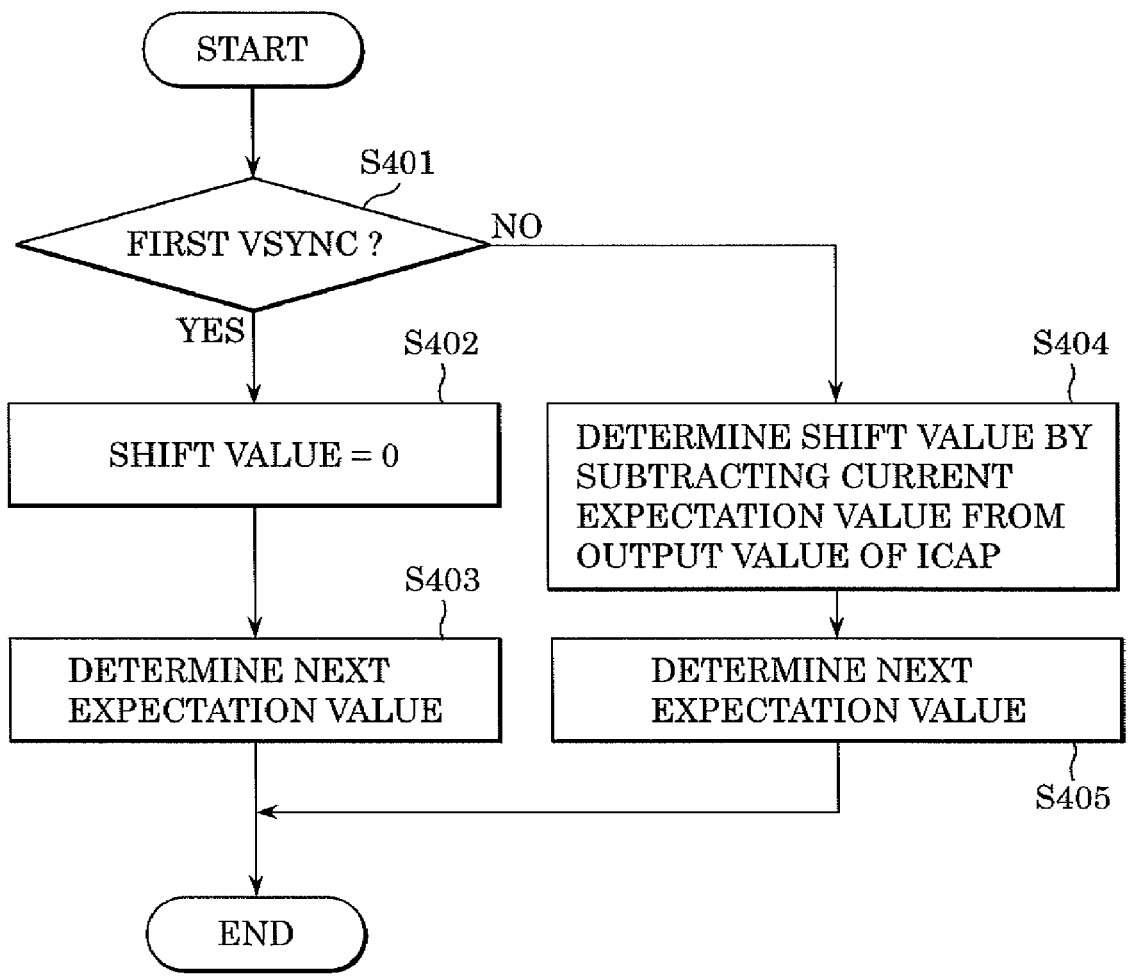
FIG. 4 is a flowchart showing a shift value calculating algorithm according to an embodiment of the present invention.

The controller 121 reads the output value of the ICAP 120 when the output pulse of the synchronizer 116 rises, and calculates a shift value between the first crystal oscillator 114 and the second crystal oscillator 118 according to a shift value calculating algorithm shown in FIG. 4. It is to be understood that the shift value between the first crystal oscillator 114 and the second crystal oscillator 118 represents a shift between the first crystal oscillator 114 and the second crystal oscillator 118. Furthermore, since the first crystal oscillator 114 generates the clock A for sampling the video signal and the second crystal oscillator 118 generates the clock B for sampling the audio signal, a shift between the first crystal oscillator 114 and the second crystal oscillator 118 corresponds to a shift between the video and audio.

FIG. 4 is a flowchart showing the shift value calculating algorithm performed by the controller 121 according to an embodiment of the present invention. The shift value calculating algorithm shown in FIG. 4 is performed each time the VSYNC pulse is generated. The shift value calculating algorithm shown in FIG. 4 starts when an instruction to start capturing video with audio is given. Furthermore, the image capture device according to the present embodiment is configured to start recording video with audio onto the storage medium 112 when an instruction to start capturing the video with audio is given.

In step S401, the controller 121 determines whether the first VSYNC pulse has been generated. If the first VSYNC pulse has been generated, the algorithm proceeds to step S402. If it is determined that the second or other VSYNC pulse has been generated, the algorithm proceeds to step S404.

In step S402, the controller 121 sets the shift value to 0.

In step S403, the controller 121 reads the output value of the ICAP 120, and adds the value counted by the clock C generated in the period of one frame to the output value of the ICAP 120 to generate a next expectation value. For example, if the number of clocks generated in the period of one frame is 30000, when the free-run counter 119 has 16 bits, the next expectation value is given by the following equation:

$$(\text{next expectation value}) = ((\text{output value of the } ICAP\ 120) + 30000)\ \&\ \text{0x0}FFFF$$

In the equation, symbol & represents the bitwise AND operation. The expectation value generated in step S403 is used as an expectation value for the next VSYNC pulse.

In step S404, the controller 121 reads the output value of the ICAP 120, and calculates the shift value by subtracting the current expectation value from the output value of the ICAP 120.

In step S405, the controller 121 adds the value counted by the clock C generated in the period of one frame to the current expectation value to generate a next expectation value. For example, if the number of clocks generated in one frame is 30000, when the free-run counter 119 has 16 bits, the next expectation value is given by the following equation:

$$(\text{next expectation value}) = ((\text{current expectation value}) + 30000)\ \&\ (\text{0x0}FFFF)$$

In the equation, symbol & represents the bitwise AND operation. The expectation value generated in step S405 is used as an expectation value for the next VSYNC pulse.

The controller 121 determines a shift value according to the algorithm shown in FIG. 4.

If the shift value is positive, the controller 121 determines that the clock A has a lower frequency than a desired value. If the shift value is negative, the controller 121 determines that the clock A has a higher frequency than the desired value.

If the shift value is positive, the controller 121 determines that the clock A has a lower frequency than the desired value, and determines a correction value for reducing the period of one frame by the period corresponding to the shift value. This correction value is, for example, given by X1−X2/X3. In the equation, X1 represents the count value of one horizontal period (H period) that is counted by the clock A, X2 represents a value given by multiplying the absolute shift value by the period of the clock C, and X3 represents the period of the clock A. After the correction value is obtained, the controller 121 supplies the correction value to the SSG 115.

If the shift value is negative, the controller 121 determines that the clock A has a higher frequency than the desired value, and determines a correction value for extending the period of one frame by the period corresponding to the shift value. This correction value is, for example, given by X1+X2/X3. In the equation, X1 represents the count value of one horizontal period (H period) that is counted by the clock A, X2 represents a value given by multiplying the absolute shift value by the period of the clock C, and X3 represents the period of the clock A. After the correction value is obtained, the controller 121 supplies the correction value to the SSG 115.

Figure 5:
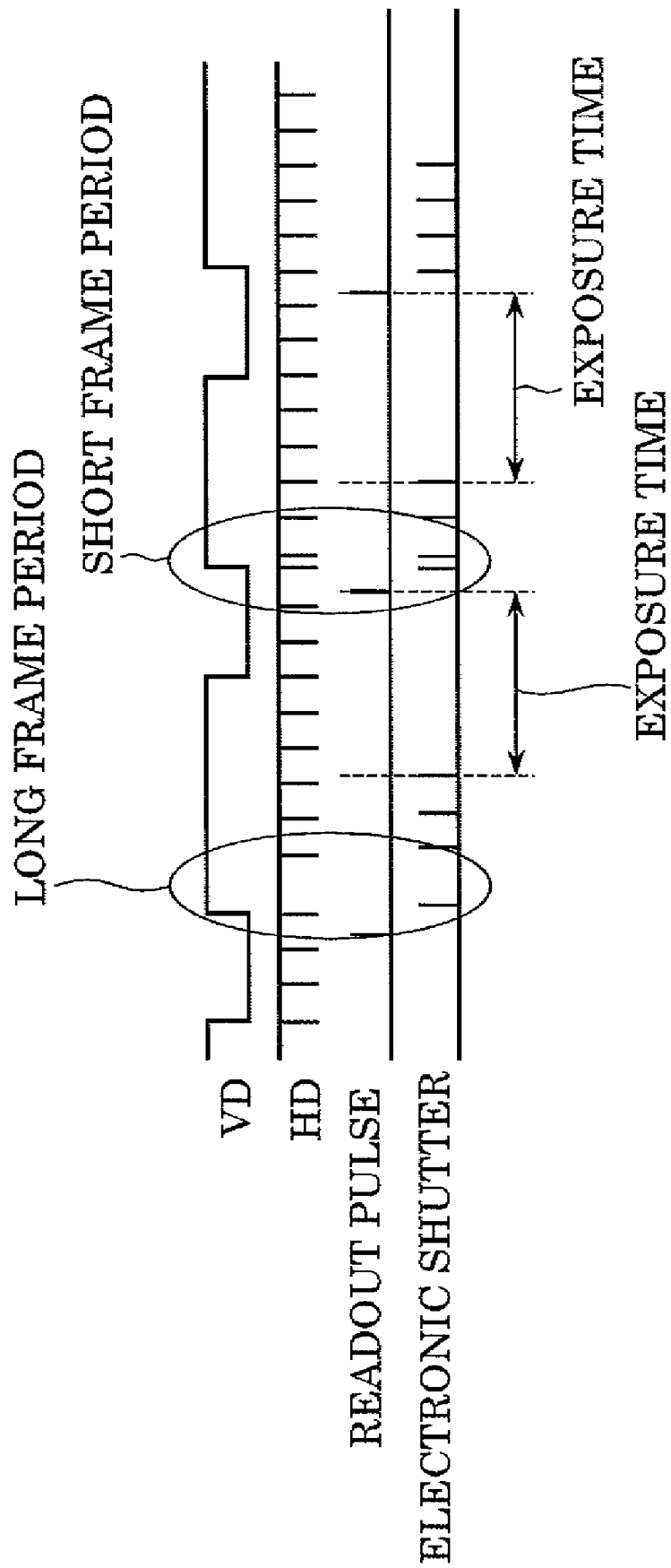
FIG. 5 is a chart showing a process for correcting a shift value according to an embodiment of the present invention.

The SSG 115 adjusts the length of a given 1 H period according to the correction value supplied from the controller 121 in the manner shown in FIG. 5. Thus, the driving timing of the image sensor 102 can be adjusted to suppress the occurrence of a shift between the video and audio.

Figure 6:
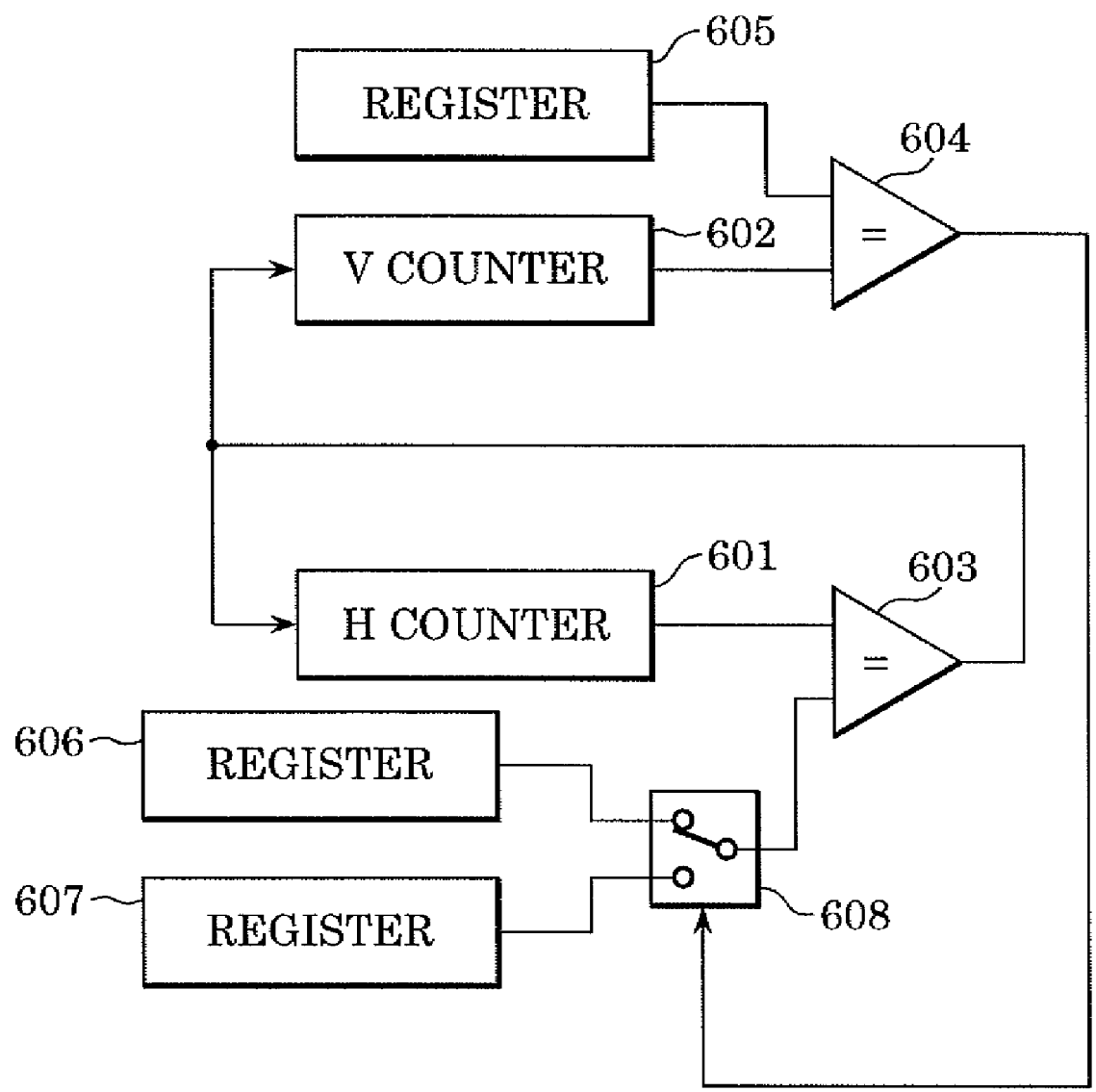
FIG. 6 is a block diagram of a main portion of a sync signal generator (SSG).

FIG. 6 is a block diagram of a main portion of the SSG 115.

In FIG. 6, a register 605 holds the value corresponding to the 1 H period subsequent to a 1 H period in which the TG 113 generates a readout pulse. A register 606 holds the count value of a 1 H period that is counted by the clock A. A register 607 holds the correction value supplied from the controller 121.

An H counter 601 updates the count value each time the clock A rises. A comparator 603 determines whether an output value of the H counter 601 is equal to an output value of a selector 608. The selector 608 typically selects an output value of the register 606. If the two output values are equal, the H counter 601 is reset, and the count value returns to 0.

A V counter 602 updates the count value each time an output value of the H counter 601 is equal to an output value of the selector 608. A comparator 604 determines whether an output value of the V counter 602 is equal to an output value of the register 605. That is, the comparator 604 determines whether an output value of the V counter 602 is equal to the value corresponding to the 1 H period subsequent to a 1 H period in which the TG 113 generates a readout pulse. If the two output values are equal, the selector 608 selects the register 607.

The SSG 115 can extend or reduce a given 1 H period (that is, the 1 H period subsequent to a 1 H period in which the TG 113 generates a readout pulse) using the correction value. Thus, the occurrence of a shift between the video and audio is suppressed.

When the image sensor 102 is driven at a rate of 30 fps, the interval between readout pulses is 1/30 sec. If the shutter speed of an electronic shutter is higher than 1/30, adjustment of a given 1 H period does not affect the exposure time.

In the present embodiment, a shift value is corrected only in the H period subsequent to an H period in which a readout pulse is generated. However, a shift value may be corrected in one or a plurality of H periods from the H period subsequent to an H period in which a readout pulse is generated until an effective video period begins.

In the image capture device according to the present embodiment, therefore, when a clock for sampling a video signal is generated using a first crystal oscillator and a clock for sampling an audio signal is generated using a second crystal oscillator different from the first crystal oscillator, the occurrence of a shift between the video and audio can be suppressed. Thus, if video with audio is captured for a long time, the occurrence of a shift between the video and audio can be suppressed so that users can play back the video without experiencing uncomfortable feelings associated with the occurrence of a shift between the audio and the video. That is, the shift between the clock for sampling the video signal and the clock for sampling the audio signal is corrected so that the shift is not perceivable by users during playback of the video and audio signals.

In the image capture device according to the present embodiment, a shift between the video and audio only in a certain H period can be adjusted. Thus, the occurrence of the shift between video and audio can be suppressed with a small amount of hardware configuration.

In the image capture device according to the present embodiment, a free-run counter can be used to detect a shift between audio and video. A counter for use in other processing can be used, and the hardware configuration and the production cost can therefore be reduced.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Applications No. 2004-030828 filed Feb. 6, 2004 and No. 2005-023510 filed Jan. 31, 2005, which are hereby incorporated by reference herein.

What is claimed is:

1. An image capture device comprising:
    an image capture unit that captures optical images and outputs a video signal corresponding to the optical images;
    a microphone unit that outputs an audio signal;
    a first clock generating unit that generates a first clock using a first crystal oscillator;
    a second clock generating unit that generates a second clock using a second crystal oscillator;
    a first sampling unit that samples the video signal using the first clock to generate video data;
    a second sampling unit that samples the audio signal using the second clock to generate audio data;
    a first compressor that compresses the video data generated by the first sampling unit;
    a second compressor that compresses the audio data generated by the second sampling unit;
    a calculating unit that calculates a correction value for adjusting a shift between the first crystal oscillator and the second crystal oscillator; and
    an adjusting unit that adjusts a driving timing of the image capture unit using the correction value,
    wherein the correction value is calculated by the calculating unit using a VSYNC pulse and a third clock, and
    wherein the VSYNC pulse is synchronized with a vertical synchronization signal, and the third clock is used to count one period of the vertical synchronization signal.

2. An image capture device according to claim 1, wherein the adjusting unit adjusts a length of a predetermined horizontal period using the correction value to adjust a driving timing of the image capture unit.

3. An image capture device according to claim 2, wherein the predetermined horizontal period includes a horizontal period subsequent to a horizontal period in which a readout pulse is generated, and
wherein the readout pulse is provided to the image capture unit.

4. An image capture device according to claim 2, wherein the predetermined horizontal period includes one or more horizontal periods from a horizontal period subsequent to a horizontal period in which a readout pulse is generated until an effective video period begins, and
wherein the readout pulse is provided to the image capture unit.

5. An image capture device according to claim 1, wherein the adjusting unit adjusts a horizontal synchronization signal using the correction value to adjust a driving timing of the image capture unit.

6. An image capture device according to claim 5, wherein the horizontal synchronization signal is generated using the first clock.

7. An image capture device according to claim 1, wherein the vertical synchronization signal is generated using the first clock.

8. An image capture device according to claim 1, wherein the second clock generating unit generates the third clock using the second crystal oscillator.

9. An image capture device according to claim 1, further comprising:
a video file generator that generates a video file including the video data compressed by the first compressor and the audio data compressed by the second compressor.

10. An image capture device according to claim 9, further comprising:
a recorder that records the video file generated by the video file generator on a storage medium.

11. An image capture device according to claim 1, wherein the image capture device is a digital camera.

12. An image capture device according to claim 1, wherein the image capture device is a portable phone including a camera.

13. A method of adjusting a shift between a first crystal oscillator and a second crystal oscillator, the first crystal oscillator and the second crystal oscillator being included in an image capture device, the method comprising:
generating a first clock using the first crystal oscillator;
generating a second clock using the second crystal oscillator;
sampling a video signal using the first clock to generate video data, wherein the video signal corresponds to optical images captured by an image capture unit of the image capture device and is output from the image capture unit;
sampling an audio signal using the second clock to generate audio data, wherein the audio signal is output from a microphone unit of the image capture device;
compressing the generated video data;
compressing the generated audio data;
calculating a correction value for adjusting a shift between the first crystal oscillator and the second crystal oscillator; and
adjusting a driving timing of the image capture unit using the correction value,
wherein the correction value is calculated using a VSYNC pulse and a third clock, and
wherein the VSYNC pulse is synchronized with a vertical synchronization signal, and the third clock is used to count one period of the vertical synchronization signal.

14. A method according to claim 13, further comprising:
adjusting a length of a predetermined horizontal period using the correction value to adjust a driving timing of the image capture unit.

15. A method according to claim 14, wherein the predetermined horizontal period includes a horizontal period subsequent to a horizontal period in which a readout pulse is generated, and
wherein the readout pulse is provided to the image capture unit.

16. A method according to claim 14, wherein the predetermined horizontal period includes one or more horizontal periods from a horizontal period subsequent to a horizontal period in which a readout pulse is generated until an effective video period begins, and
wherein the readout pulse is provided to the image capture unit.

17. A method according to claim 13, further comprising:
adjusting a horizontal synchronization signal using the correction value to adjust a driving timing of the image capture unit.

18. A method according to claim 17, further comprising:
generating the horizontal synchronization signal using the first clock.

19. A method according to claim 13, further comprising:
generating the vertical synchronization signal using the first clock.

20. A method according to claim 13, further comprising:
generating the third clock using the second crystal oscillator.

21. A method according to claim 13, further comprising:
generating a video file including the compressed video data and the compressed audio data.

22. A method according to claim 21, further comprising:
recording the generated video file on a storage medium.

23. A method according to claim 13, wherein the image capture device is a digital camera.

24. A method according to claim 13, wherein the image capture device is a portable phone including a camera.

25. An image capture device comprising:
an image capture unit that captures optical images and outputs a video signal corresponding to the optical images;
a microphone unit that outputs an audio signal;
a first clock generating unit that generates a first clock;
a second clock generating unit that generates a second clock;
a first converter that generates video data from the video signal using the first clock;
a second converter that generates audio data from the audio signal using the second clock;
a first compressor that compresses the video data generated from the video signal;
a second compressor that compresses the audio data generated from the audio signal;
a calculating unit that calculates a correction value using a vertical synchronization signal and a third clock; and
an adjusting unit that adjusts a length of a predetermined horizontal period using the correction value,
wherein the vertical synchronization signal is generated using the first clock, and
wherein the third clock is generated by the second clock generating unit and is used to count one period of the vertical synchronization signal.

26. An image capture device according to claim 25, wherein the first converter includes a first sampling unit configured to sample the video signal using the first clock to generate the video data, and
wherein the second converter includes a second sampling unit configured to sample the audio signal using the second clock to generate the audio data.

27. An image capture device according to claim 25, wherein the first clock generating unit is configured to generate the first clock using a first crystal oscillator, and
wherein the second clock generating unit is configured to generate the second clock and the third clock using a second crystal oscillator.

28. An image capture device according to claim 25, further comprising:
a synchronization signal generating unit that generates the vertical synchronization signal using the first clock.

29. An image capture device according to claim 28, wherein the synchronization signal generating unit is configured to generate a horizontal synchronization signal using the first clock.

30. An image capture device according to claim 25, wherein the adjusting unit adjusts the length of the predetermined horizontal period using the correction value to adjust a driving timing of the image capture unit.

31. An image capture device according to claim 25, wherein the predetermined horizontal period includes a horizontal period subsequent to a horizontal period in which a readout pulse is generated, and
wherein the readout pulse is provided to the image capture unit.

32. An image capture device according to claim 25, further comprising:
a video file generator that generates a video file using the video data compressed by the first compressor and the audio data compressed by the second compressor.

33. An image capture device according to claim 32, further comprising:
a recorder that records the video file generated by the video file generator on a storage medium.

34. An image capture device according to claim 25, wherein the image capture device is a digital camera.

35. An image capture device according to claim 25, wherein the image capture device is a portable phone including a camera.

36. A method of adjusting a length of a predetermined horizontal period, the method comprising:
generating a first clock by a first clock generating unit;
generating a second clock by a second clock generating unit;
generating video data from a video signal using the first clock, wherein the video signal corresponds to optical images captured by an image capture unit of an image capture device and is output from the image capture unit;
generating audio data from an audio signal using the second clock, wherein the audio signal is output from a microphone unit of the image capture device;
compressing the video data generated from the video signal;
compressing the audio data generated from the video signal;
calculating a correction value using a vertical synchronization signal and a third clock; and
adjusting the length of the predetermined horizontal period using the correction value,
wherein the vertical synchronization signal is generated using the first clock, and
wherein the third clock is generated by the second clock generating unit and is used to count one period of the vertical synchronization signal.

37. A method according to claim 36, further comprising:
sampling the video signal using the first clock to generate the video data; and
sampling the audio signal using the second clock to generate the audio data.

38. A method according to claim 36, wherein the first clock generating unit is configured to generate the first clock using a first crystal oscillator, and
wherein the second clock generating unit is configured to generate the second clock and the third clock using a second crystal oscillator.

39. A method according to claim 36, further comprising:
generating the vertical synchronization signal using the first clock.

40. A method according to claim 39, further comprising:
generating a horizontal synchronization signal using the first clock.

41. A method according to claim 36, further comprising:
adjusting the length of the predetermined horizontal period using the correction value to adjust a driving timing of the image capture unit.

42. A method according to claim 36, wherein the predetermined horizontal period includes a horizontal period subsequent to a horizontal period in which a readout pulse is generated, and
wherein the readout pulse is provided to the image capture unit.

43. A method according to claim 36, further comprising:
generating a video file using the compressed video data and the compressed audio data.

44. A method according to claim 43, further comprising:
recording the generated video file on a storage medium.

45. A method according to claim 36, wherein the image capture device is a digital camera.

46. A method according to claim 36, wherein the image capture device is a portable phone including a camera.

* * * * *